United States Patent Office 2,706,896
Patented Apr. 26, 1955

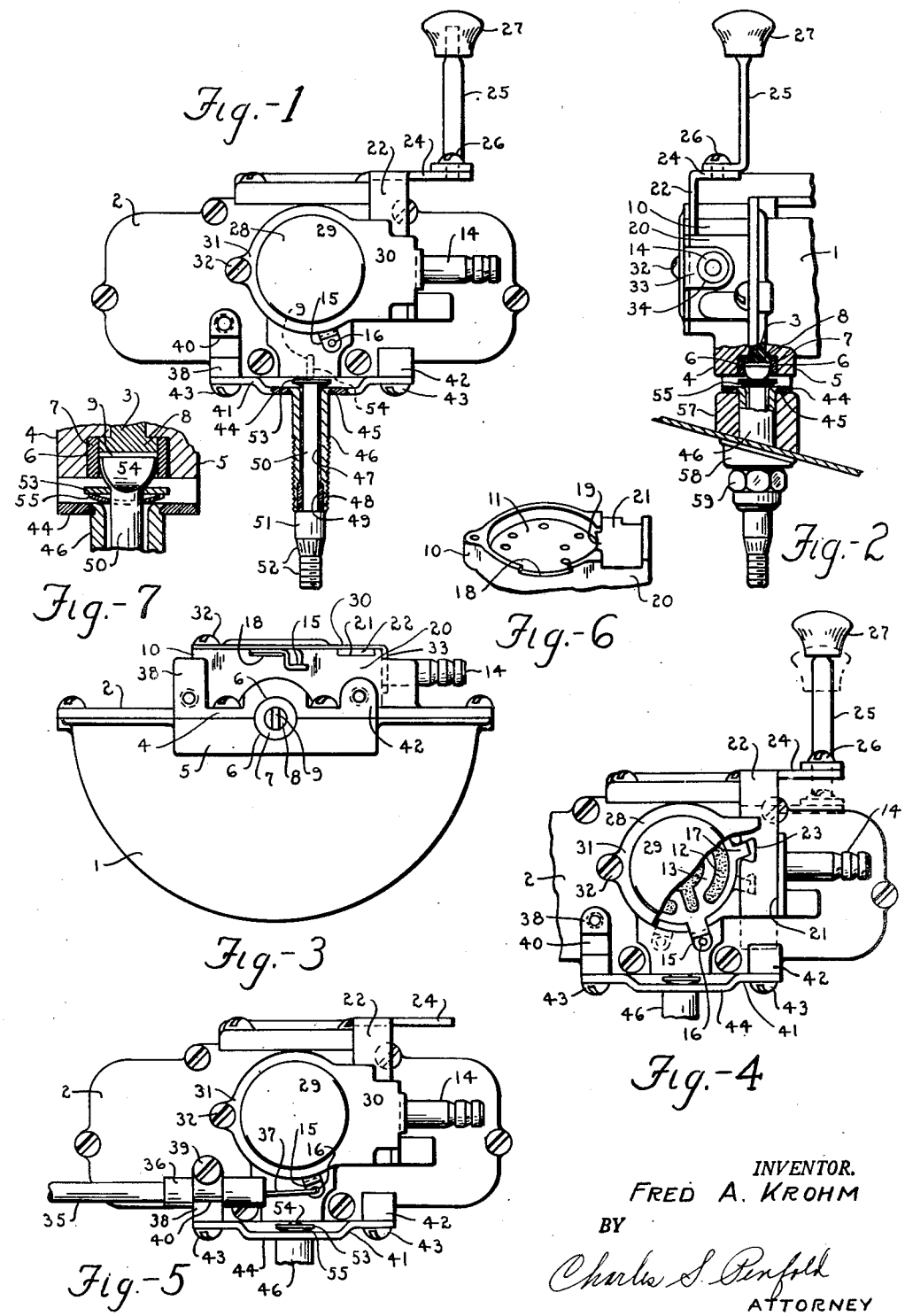

2,706,896

SHAFT ASSEMBLY FOR WINDSHIELD WIPER

Fred A. Krohm, Gary, Ind., assignor to Productive Inventions, Inc., a corporation of Indiana Application December 24, 1949, Serial No. 134,920

2 Claims. (Cl. 64—4)

This invention is directed to improvements in windshield wiper motors.

Practically every motor vehicle included in the more than 40,000,000 now in service is equipped with a power unit or motor employed to drive a windshield wiper. The majority of motor vehicles probably more than 30,000,000 in all have windshield wipers driven by vacuum motors. Heretofore, practically all vacuum wiper motor replacements have had to be exact replicas of the motor used for original equipment.

Due to this fact and other variations in construction of original equipment motors it has previously been necessary for a retail service station making vacuum motor replacements in kind to carry in stock many more than 100 different vacuum windshield wiper motors of a certain make, not one of which is normally usable in substitution for any other one of the group. All motors in this class are provided with a valve for controlling the flow of fluid passing through the motor, including a manual control device for actuating the valve. The kinds of manual controls are numerous and vary in accordance with the installation requirements for the motor, so that, for example, a control device employed on a late model of automotive vehicle cannot be used on an earlier model.

As emphasizing, particularly the purpose and utilization of the subject invention, a very large number of separate, special and different shafts and fittings therefor have heretofore been recommended for the retailer to carry for the purpose of completing the manufacture, by the dealer, of vacuum motors to adapt them to desired installations. Even with the many different shafts and fittings employed in the field, the service retailer encounters a very large percentage of motor vehicles to which none of the parts in his stock will accommodate a motor.

As a result wholesalers and retailers of replacement vacuum motors attempting to give broad service are required to carry heavy investments in motor inventory occupying much space and requiring much attention in ordering for inventory replacements. Between the wholesaler and the retailer, inventory deficiencies occasion serious delays in making needed motor replacements and thus delay effecting desirable reduction in driving hazards.

Because of difficulty in maintaining complete inventories of replacement vacuum motors for full service range, retailers, perhaps in more instances than otherwise, after ascertaining customer-car-owner's need for a vacuum motor, are required to make a special trip to a wholesaler, perhaps in another town, to get the particular motor. The wholesaler in his turn is often required to procure the motor from a distant "master" or "central" warehouse—all of which occasions delay and requires time-consuming effort and excessive expense, often exceeding in cost the value of the motor itself and perhaps seldom leaving any compensation for the reseller.

Accordingly, one important object of the subject invention is to overcome many of the disadvantages above referred to by providing the motor with a valve and a support which are of such a character that any one of a plurality of different kinds of manual controls can be operatively connected to the valve.

An object of the invention is to provide a valve having a cover which serves the dual purpose of maintaining the valve and a manual control device in their respective operative positions.

Another object of the invention is to provide the motor with a nipple for connection with a conduit leading to a vacuum supply and the cover with means cooperable with the nipple whereby to assist in locking the cover in a predetermined position.

A particular object of the invention is to provide a shaft subassembly which is adapted for detachable connection with the motor shaft so as to constitute a continuation or prolongation thereof, the subassembly being so constructed and arranged that when utilized in combination with the subject motor the latter may serve as a substitute for any one of a plurality of different models of original equipment motors having different shafts.

Another object of the invention is to provide a shaft subassembly of the character just referred to in which a bracket constituting a component thereof is adapted to be connected to the support to which the manual control is adapted to be connected.

An additional object of the invention is to provide a construction whereby the shaft of the subassembly is resiliently urged into engagement with the motor shaft and the resilient means for this purpose serves to eliminate vibration which might otherwise occur when the shafts are in driving relationship.

Also, an object of the invention is to provide the motor shaft with a tubular sleeve of such a character that it serves as a socket for the inner end of the shaft of the subassembly and as a reinforcing member at the point of engagement between the shafts.

A further object of the invention is to provide a construction in which the shaft of the subassembly is rotatably supported in a tubular fitting constituting a component of the subassembly and in which the fit between the shaft and fitting is relatively loose adjacent the inner side of the subassembly so that the inner end of the shaft may accommodate itself for proper interconnection with the motor shaft. This loose fit also has the advantage of permitting any water seeping inwardly between the fitting and shaft to drain from the subassembly, thereby preventing its entry into the interior of the motor chamber.

Other objects and advantages of the invention will become apparent after the description hereinafter set forth is considered in conjunction with the drawings annexed hereto.

Referring to the drawings wherein like parts are designated by the same numerals:

Figure 1 is a top view of a motor embodying the invention with a portion of the shaft subassembly in section for the purpose of exemplifying details of construction;

Figure 2 is an end view of the motor illustrated in Figure 1 shown installed and supported on an appropriate part of an automotive vehicle, portions of the construction being shown in section for the purpose of showing details of construction;

Figure 3 is a side view in elevation of the motor, the shaft subassembly being omitted;

Figure 4 is a top view of the motor with portions broken away for the purpose of illustrating, among other things, the manner in which one of a plurality of different types of manual control devices can be operatively connected to the valve of the motor;

Figure 5 is a top view of the motor, similar to Figure 4, illustrating the manner in which a different type of manual control device may be operatively connected to the valve;

Figure 6 is a partial perspective view of the valve body; and

Figure 7 is an enlarged view of a portion of the inner extremity of the shaft subassembly.

The motor illustrated in the drawings includes, among other things, a housing 1 and a cover 2, secured together to form a chamber within which oscillates a vane supported on a shaft 3. The housing and cover are preferably constructed of a suitable die-cast material. This shaft is supported on the motor with its outer end arranged between complementary integral portions 4 and 5 of the cover and housing as shown in Figure 3. The integral portions are preferably provided with corresponding notches 6 which cooperate to form a cylindrical recess. A tubular sleeve 7 is press fitted onto an enlarged head 8 of the shaft for movement therewith. This sleeve for the shaft is journalled for rotation substantially within the confines of the recess. The head 8 is preferably provided with a transverse slot 9, the purpose of which will be described more in detail subsequently.

The cover 2 includes a valve body 10, the upper side of which is provided with a round recess 11 which rotatably receives a primary or throttle valve 12 and an actuating member 13 interconnected for movement with the valve. The valve body is provided with a plurality of passageways as illustrated in Figure 6, certain of which lead to the motor chamber on opposite sides of the vane and to a secondary valve of an automatic actuating mechanism (not shown). A nipple 14 is carried by the body 10 for connection with a vacuum supply. The primary valve serves to control the operation of the motor by regulating the flow of fluid through the passageways.

The actuating member 13 of the valve is provided with attaching means preferably in the form of an integral radially extending lever 15 having a hole 16 therein. This actuating member is also provided with attaching means preferably in the form of a radial projection finger 17 spaced circumferentially from the lever 15. The rotational movement of the valve may be determined by the end limits of one or both of the pair of notches 18 and 19 shown in Figure 6, which respectively receive the lever and projection, but is preferably determined by the notch 19.

The valve body 10 also includes an integral offset 20, the upper side of which is provided with a channel recess 21 connecting with the round recess 11 through the notch 19.

As pointed out above the motor is provided with means whereby either of two manual control devices may be employed to increase the range of the adaptability of the motor for replacement purposes.

One of these devices, among other things, as shown in Figure 4, includes a reciprocating member having a portion 22 slidable in the recess 21 substantially tangentially with respect to the primary valve 12. The inner longitudinal marginal edge of portion 22 is provided with a notch 23, generally dove-tail in shape, which receives the radial projection 17 of the actuating member 13. The reciprocating member may also include an offset portion 24 to which a rod 25 is detachably connected by a screw 26. A handle or knob 27 is carried by the rod for manipulating the reciprocating member to rotate the valve 12.

As clearly exampiified in the drawings a cover 28 overlies the valve 12 and its actuating member 13 and the reciprocating member to hold them in their relative positions. More particularly in this respect, the cover includes a generally round portion 29 and an offset portion 30 which respectively overlie the valve 12 and the slidable portion 22 of the reciprocating member. The cover is unique in character in that it serves the plural purposes of maintaining the valve, actuating member and reciprocating member assembled with the motor. Moreover, the actuating member is held assembled with the valve and the reciprocating member assembled with the actuating member. The round portion 29 of cover is provided with an ear 31 having a hole therein through which a screw 32 extends into a tapped hole in the valve body 10 for holding one end of the cover in place. The offset portion 30 of the cover is provided with an angular portion 33 which bears against an end of the body and has an aperture 34 therein as shown Figure 2, which receives the nipple 14 to hold the other end of the cover in place. With this novel arrangement the cover can be readily assembled with the motor by merely threading the nipple through the aperture 34 until the angular portion 33 of the cover engages an end of the valve body 10 which locates the cover in a position to cause the hole in the ear 31 as shown in Figure 3. to register with the tapped hole in the body whereupon the screw 32 can be driven home. It will also be evident that the nipple serves as a conduit and a fastening device. Moreover, it will be manifest that if the rod 25 and handle 27 are not required for a particular replacement installation, they can be readily detached from the motor by simply removing the screw 26. Although not intended, it will be obvious that if found desirable the reciprocating member 22 can also be detached.

The other manual control device which may be utilized to advantage in accordance with different installation requirements when the first described control device is not applicable is clearly depicted in Figures 1 and 5 of the drawing. This second manual control device is preferably of a type whereby the motor can be controlled from a remote distance and includes, among other things, a flexible unit comprised of a tubular guide 35 having a connector 36 anchored at one end thereof and a wire 37 longitudinally slidable in the guide. The inner end of the wire is adapted for detachable connection with the lever 15 of the actuating member 13 through the hole 16. A knob or handle (not shown) is adapted to be carried by the outer end of the control unit for manipulating the wire to rotate the valve. The inner end of the unit is preferably adapted for detachable connection with a standard support 38 by a screw 39. More particularly in this respect, the support 38 is formed integral with the cover 2 and its upper end is provided with a substantially semi-circular notch 40 which preferably snugly receives a reduced cylindrical portion formed intermediate the enlarged ends of the connector 36 to establish an interlocking connection and which will prevent movement of the connector in a direction in accordance with its longitudinal axis. The head of the screw 39 is adapted to engage the reduced portion of the connection to lock the connector in place.

In view of the foregoing it will be apparent that if the replacement specifications require a motor provided with a subassembly comprised of the rod 25 and knob 27 it is a simple matter to connect such a subassembly to the motor by means of the screw 26. If on the other hand the specifications call for a motor provided with a flexible control assembly or unit it can be readily connected to the motor in the manner described. Thus, one or the other of the control devices may be employed depending on the installation requirements. It will also be evident that rods of different sizes and lengths may be employed to promote the adaptability of the motor.

As pointed out at the beginning of the specification an important object of the invention is to provide a single motor which may be adapted to replace any one of considerable number original equipment motors. This in part is accomplished by the improved control devices above described. Its adaptability or universal application is further accomplished by providing a shaft subassembly which may be made in different sizes or lengths.

This shaft subassembly preferably includes an elongated bracket 41 having a hole at each end. A support 42 is formed on the cover 2 and spaced from the support 38. A side of each of the supports 38 and 42 is provided with a threaded hole as shown in Figure 3. Screws 43 extend through the holes in the ends of the bracket and into the holes in the supports for detachably securing the subassembly to the motor. An intermediate portion 44 of the bracket is preferably offset to assume a spaced parallel position with respect to the outer substantially planar sides of the complementary integral portions 4 and 5 of the cover and housing.

As shown in Figures 1 and 2, the center of the intermediate offset portion 44 is provided with an aperture 45 and the inner end of a tubular fitting 46 is permanently anchored in the aperture. This fitting is provided with an internal bore 47 which extends throughout most of its length and a counterbore 48 at its outer end. A bearing 49 is fitted in the counterbore for rotatably supporting a secondary shaft 50 which extends through the fitting 46. The outer end of the shaft 50 is preferably enlarged at 51 and provided with conventional attaching portions 52 to which the inner section of a wiper arm may be operatively connected. It is to be noted that the enlargement 51 engages the outer end of the fitting to limit the inward movement of the shaft, and a washer 53 loosely carried on the inner end of the shaft and located in the space between the bracket and motor limits the outward movement of the shaft and thereby retains the shaft in the tubular fitting.

The inner end of the secondary shaft 50 is provided with an integral tenon or key 54, preferably formed by swaging, and is of a configuration corresponding to the general shape of the slot 9 formed in the head 8 of the motor shaft 3. This key is seated in the slot to couple the shafts for simultaneous rotation. Resilient means, preferably in the form of a spring washer 55 is carried by the shaft 50 and is interposed between the washer 53 and the bracket for urging the shaft 50 toward the motor shaft.

Attention is directed to the fact that the bore 47 is of a diameter somewhat greater than the cross-sectional diameter of that portion of the shaft located in the fitting 46. This difference in diameters provides a loose fit between the inner extremity of the shaft 50 and fitting so that the key 54 may better accommodate or adjust itself for entry into the slot. The spring washer 55 also assists in this adjustment and serves to urge the shaft 50 into the slot and at the same time automatically takes up any slack due to variations in dimensions, thereby eliminating vibration. As pointed out above the clearance about the shaft 50 also serves to permit any water seeping inwardly between the fitting and shaft to drain from the shaft subassembly. Since the inner end of the fitting is spaced from the motor by the offset portion 44 of the bracket any water that might accumulate in the fitting can drip off the fitting.

It is to be noted that the width of the key is of a size slightly less than the internal diameter of the reinforcing sleeve 7 so that the shaft 50 will be maintained in coaxial alignment with the motor shaft.

The sleeve serves as a socket for the key and reinforces the connection between the two shafts. It is to be understood that if found desirable this arrangement may be reversed so that the secondary shaft is provided with a socket and the motor shaft with a key.

Having thus described my invention, it is obvious that various modifications may be made in the same without departing from the spirit of the invention, and, therefore I do not wish to be understood as limiting myself to the exact form, construction, arrangement and combination of parts herein shown and described and defined in the claims.

I claim:

1. A shaft assembly adapted for association with a windshield wiper motor having a primary shaft provided with cooperating means, said assembly including a bracket for detachably connecting the assembly to such a motor, a fitting having its inner end fixed to the bracket, said fitting being provided with a bore, a bearing carried by the outer end of the fitting, a secondary shaft extending through the fitting and bearing means and provided with means adjacent its outer end for limiting axial movement of the shaft in one direction, and provided with means adjacent its inner end for limiting its axial movement in an opposite direction, the internal diameter of the bore being somewhat greater than the cross-sectional diameter of the secondary shaft so that the inner end of the latter may move laterally relative to the fitting to facilitate its engagement with the cooperating means on the motor shaft when the shaft assembly is connected to a motor by means of the bracket, and resilient means carried by the inner end of the secondary shaft assisting to support and center the secondary shaft in the bore of the fitting.

2. A windshield wiper motor having a primary shaft provided with cooperating means constituting a component of a connection, a tubular member carried by the primary shaft and surrounding the cooperating means, a bracket attached to the motor, a fitting having its inner end fixed to the bracket, said fitting being provided with a bore, a bearing carried by the outer end of the fitting, a secondary shaft extending through the fitting and bearing means and provided with means adjacent its ends for limiting axial movement of the shaft in opposite directions, means provided on the inner end of the secondary shaft disposed in the tubular member and connected with the cooperating means on the primary shaft to provide a driving connection between the shafts, the internal diameter of the bore being somewhat greater than the cross-sectional diameter of the secondary shaft so that the inner end of the latter may move laterally relative to the fitting to facilitate its engagement with the cooperating means on the primary shaft when the bracket is attached to the motor, and resilient means adjacent the inner end of the secondary shaft assisting to support and center this shaft in the bore of the fitting.

References Cited in the file of this patent

UNITED STATES PATENTS

| Number | Name | Date |
|---|---|---|
| 1,191,700 | Howes | July 18, 1916 |
| 1,328,095 | Merrill | Jan. 13, 1920 |
| 1,666,972 | Miller et al. | Apr. 24, 1928 |
| 1,691,200 | Krug | Nov. 13, 1928 |
| 1,738,311 | Oishei et al. | Dec. 3, 1929 |
| 1,849,327 | Hueber | Mar. 15, 1932 |
| 1,868,587 | Richards | July 26, 1932 |
| 1,989,846 | Christman | Feb. 5, 1935 |
| 2,006,653 | Reisingor | July 21, 1935 |
| 2,075,959 | Previti | Apr. 6, 1937 |
| 2,186,657 | Saussure | Jan. 9, 1940 |
| 2,278,095 | Rogers | Mar. 31, 1942 |
| 2,302,158 | Van Vulpen | Nov. 17, 1942 |
| 2,344,913 | Ager | Mar. 21, 1944 |